United States Patent
Kleinburd et al.

(10) Patent No.: US 12,542,665 B2
(45) Date of Patent: Feb. 3, 2026

(54) METHOD FOR ENHANCING KEY-SWITCHING EFFICIENCY FOLLOWING MODRAISE IN FULLY HOMOMORPHIC ENCRYPTION

(71) Applicant: Chain Reaction, Ltd., Tel Aviv (IL)

(72) Inventors: Noam Kleinburd, Hashmonaim (IL); Oren Vrubel, Tel Aviv (IL); Ilan Rosenfeld, Petah Tikva (IL)

(73) Assignee: Chain Reaction, Ltd., Tel Aviv (IL)

( * ) Notice: Subject to any disclaimer, the term of this patent is extended or adjusted under 35 U.S.C. 154(b) by 0 days.

(21) Appl. No.: 19/006,608

(22) Filed: Dec. 31, 2024

(65) Prior Publication Data
US 2025/0300832 A1  Sep. 25, 2025

Related U.S. Application Data

(60) Provisional application No. 63/568,472, filed on Mar. 22, 2024.

(51) Int. Cl.
  *H04L 9/30* (2006.01)
  *G06F 21/57* (2013.01)
  *H04L 9/00* (2022.01)

(52) U.S. Cl.
  CPC .......... *H04L 9/3026* (2013.01); *G06F 21/575* (2013.01); *H04L 9/008* (2013.01); *G06F 2221/034* (2013.01)

(58) Field of Classification Search
  CPC .............................. H04L 9/008; H04L 9/3026
  See application file for complete search history.

(56) References Cited

U.S. PATENT DOCUMENTS

2013/0170640 A1* 7/2013 Gentry ................ H04L 9/008
 380/30
2013/0216044 A1* 8/2013 Gentry ................ H04L 9/008
 380/277

(Continued)

FOREIGN PATENT DOCUMENTS

CN  116488788 A   7/2023
KR  102616119 B1  12/2023

OTHER PUBLICATIONS

Bossuat, Jean-Philippe, Mouchet, Christian, Troncoso-Pastoriza, Juan, and Hubaux, Jean-Pierre, "Efficient Bootstrapping for Approximate Homomorphic Encryption with Non-Sparse Keys" accessed Jul. 9, 2024.

Cheon, Jung Hee, Han, Kyoohyung, Han, Minki, "Faster Homomorphic Discrete Fourier Transforms and Improved FHE Bootstrapping", accessed Dec. 23, 2024, pp. 1-18, Seoul National University, Seoul, Korea.

Halevi, Shai, Shoup, Victor, "Bootstrapping for HElib", dated Apr. 20, 2020, pp. 1-38.

(Continued)

*Primary Examiner* — Gary S Gracia
(74) *Attorney, Agent, or Firm* — M&B IP Analysts, LLC

(57) ABSTRACT

A method and system of the device may include identifying, in an FHE program, key-switching operations occurring after a ModRaise operation. In addition, the device may include determining a first aggregated polynomial sum and a second aggregated polynomial sum; and configuring instructions for performing a MultSum operation based on the determined first aggregated polynomial sum and the second aggregated polynomial sum, the instructions are programmed to be executed during runtime, where the MultSum operation outputs two polynomials, each of which is an inner product between a single cyphertext polynomial and the first aggregated polynomial sum and a single cyphertext polynomial and the second aggregated polynomial sum, thereby reducing memory usage and computational overhead and enhancing key-switching efficiency.

11 Claims, 3 Drawing Sheets

(56) References Cited

U.S. PATENT DOCUMENTS

| | | | | |
|---|---|---|---|---|
| 2016/0164670 | A1* | 6/2016 | Gentry | H04L 9/16 380/28 |
| 2016/0164671 | A1* | 6/2016 | Gentry | H04L 63/0442 380/28 |
| 2016/0164676 | A1* | 6/2016 | Gentry | H04L 9/08 380/30 |
| 2018/0109376 | A1* | 4/2018 | Gentry | H04L 9/0838 |
| 2019/0334694 | A1* | 10/2019 | Chen | H04L 9/0631 |
| 2019/0394019 | A1* | 12/2019 | Gao | H04L 9/008 |
| 2020/0076570 | A1* | 3/2020 | Musuvathi | G06F 21/72 |
| 2021/0194666 | A1* | 6/2021 | Georgieva | H04L 9/008 |
| 2021/0328766 | A1* | 10/2021 | No | H04L 9/3093 |
| 2022/0271922 | A1* | 8/2022 | No | G06F 7/523 |
| 2022/0360428 | A1* | 11/2022 | Creeger | G06F 7/544 |
| 2023/0112840 | A1* | 4/2023 | Micciancio | H04L 9/085 713/189 |
| 2023/0145760 | A1* | 5/2023 | Cheon | G06F 7/38 708/200 |
| 2023/0291541 | A1* | 9/2023 | Gupta | H04L 9/008 |
| 2023/0325529 | A1* | 10/2023 | Sav | G06N 3/045 726/26 |
| 2023/0361986 | A1* | 11/2023 | Genise | G06F 21/72 |
| 2024/0048355 | A1* | 2/2024 | Joye | H04L 9/3026 |
| 2024/0171374 | A1* | 5/2024 | Tan | H04L 9/06 |
| 2024/0364496 | A1* | 10/2024 | Chevallier-Mames | H04L 9/008 |
| 2024/0421971 | A1* | 12/2024 | Agrawal | H04L 9/008 |
| 2025/0005101 | A1 | 1/2025 | Taneja et al. | |
| 2025/0023715 | A1* | 1/2025 | Bae | H04L 9/0618 |
| 2025/0047484 | A1* | 2/2025 | Joye | H04L 9/3093 |
| 2025/0167976 | A1* | 5/2025 | Van Beirendonck | H04L 9/008 |
| 2025/0211435 | A1* | 6/2025 | Maji | H04L 9/008 |
| 2025/0266984 | A1* | 8/2025 | Cheon | H04L 9/3093 |
| 2025/0300806 | A1* | 9/2025 | Vrubel | H04L 9/3026 |
| 2025/0300807 | A1* | 9/2025 | Vrubel | H04L 9/3026 |
| 2025/0300832 | A1* | 9/2025 | Kleinburd | H04L 9/3026 |
| 2025/0337560 | A1* | 10/2025 | Bae | H04L 9/008 |
| 2025/0343671 | A1* | 11/2025 | Bae | G06N 20/00 |

OTHER PUBLICATIONS

Kim, Jongmin, Kim, Sangpyo, Choi, Jaewan, Park, Jaiyoung, Kim, Donghwan, Ahn, Jung Ho, "SHARP: A Short-Word Hierarchical Accelerator for Robust and Practical Fully Homomorphic Encryption", Jun. 17-21, 2023, pp. 1-15, ISCA'23, Orlando, Florida.

Kim, Jongmin, Lee, Gwangho, Kim, Sangpyo, Sohn, Glna, Kim, John, Rhu, Minsoo, Ahn, Jung Ho, "ARK:Fully Homomorphic Encryption Accelerator with Runtime Data Generation and Inter-Operation Key Rescue", May 3, 2022, pp. 1-14, Seoul National University.

Lattigo, "Lattigo: lattice-based multiparty homomorphic encryption library in Go", Aug. 2024, Github, https://github.com/tuneinsight/lattigo, date accessed Dec. 23, 2024.

Samardzic, Nikola, Feldmann, Axel, Manohar, Nathan, Genise, Nicholas, Eldefrawy, Karim Peikert, Chris, "Crater Lake: A Hardware Accelerator for Efficient Unbounded Computation on Encrypted Data", Jun. 18-22, 2022, pp. 1-15, ISCA, New York, New York.

Zhou, Minxuan, et al. "FHEmem: A Processing In-Memory Accelerator for Fully Homomorphic Encryption", arXiv:2311.16293v1 [cs.AR] Nov. 27, 2023.

International Search Report for PCT/IB2025/050820, dated May 7, 2025. Searching Authority, Israel Patent Office, Jerusalem, Israel.

International Search Report for PCT/IB2025/050822, dated Apr. 30, 2025. Searching Authority, Israel Patent Office, Jerusalem.

International Search Report for PCT/IB2025/050824, dated May 7, 2025. Searching Authority, Israel Patent Office, Jerusalem, Israel.

Written Opinion of the Searching Authority for PCT/IB2025/050820, dated May 7, 2025. Searching Authority, Israel Patent Office, Jerusalem, Israel.

Written Opinion of the Searching Authority for PCT/IB2025/050822, dated Apr. 30, 2025. Searching Authority, Israel Patent Office, Jerusalem.

Written Opinion of the Searching Authority for PCT/IB2025/050824, dated May 7, 2025. Searching Authority, Israel Patent Office, Jerusalem, Israel.

* cited by examiner

METHOD FOR ENHANCING KEY-SWITCHING EFFICIENCY FOLLOWING MODRAISE IN FULLY HOMOMORPHIC ENCRYPTION

CROSS-REFERENCE TO RELATED APPLICATIONS

This application claims the benefit of U.S. Provisional Application No. 63/568,472 filed on Mar. 22, 2024, the contents of which are hereby incorporated by reference.

TECHNICAL FIELD

The present disclosure relates generally to fully homomorphic encryption (FHE) schemes and, more specifically, optimizing key-switching keys (KSKs) and MultSum operations.

BACKGROUND

Fully homomorphic encryption (FHE) enables performing computations on encrypted data without needing to decrypt it. One key method used in FHE is the Cheon-Kim-Kim-Song (CKKS) encryption scheme, which is particularly suited for arithmetic operations on complex numbers. CKKS supports basic arithmetic operations like addition, subtraction, and multiplication on ciphertexts, which correspond to operations on the original plaintext values. A sequence of values can be encrypted into a single ciphertext, and this sequence can be rotated for efficient processing.

It should be mentioned that, in addition to CKKS, there are other FHE schemes, such as Brakerski-Fan-Vercauteren (BFV) and Brakerski-Gentry-Vaikuntanathan (BGV) that could benefit from the suggested key-switching method.

One of the primary challenges in FHE is managing noise accumulation during operations. As computations are performed on ciphertexts, noise within the encrypted data grows, potentially leading to incorrect decrypted results if it exceeds a certain threshold. CKKS addresses this challenge through a technique called "rescaling," which reduces the size of ciphertexts after multiplications to control noise growth. When the ciphertext size reaches a threshold, bootstrapping becomes necessary. Bootstrapping refreshes the ciphertext, increases its size, and enables continued computations, making it possible to perform an unlimited number of homomorphic operations.

CKKS manages arithmetic on vectors of approximate numbers, supporting operations such as scalar-by-vector multiplication and rotation. It encodes complex vector data into polynomials with integer coefficients modulo a chosen modulus and uses efficient multiplication in the Number Theoretical Transform (NTT) domain. High modulus values necessitate the use of Residue-Number-System (RNS) representation to reduce complexity.

Each multiplication in CKKS consumes RNS residues, and typically, the ciphertext would need to be decrypted and re-encrypted to maintain precision. However, bootstrapping can refresh multiple RNS levels without requiring decryption, using complex transformations like Coefficient-to-Slots (C2S) and Slots-to-Coefficients (S2C). These transformations are analogous to homomorphic evaluations of the Inverse Discrete Fourier Transform (IDFT) and the Discrete Fourier Transform (DFT), respectively. They utilize matrices of complex powers of unity in the same format, allowing for efficient computation.

The bootstrapping process 100 as illustrated in FIG. 1, involves three major steps: Coefficients-to-Slots (C2S) 110, Polynomial Evaluation (Sine) 120, and Slots-to-Coefficients (S2C) 130. First, the C2S step 110 performs a homomorphic evaluation of the Inverse Discrete Fourier Transform (IDFT) on the encrypted polynomial, transforming it into a format suitable for further evaluation. Next, the Polynomial Evaluation (Sine) step 120 applies a homomorphic modular reduction using a sinusoidal function, scaling the message, and producing a remainder polynomial of the modular operation. This step adjusts the message based on parameters such as secret-key density. Finally, the S2C step 130 homomorphically evaluates the Discrete Fourier Transform (DFT) on the ciphertext, returning it to an approximate version of the original encrypted message.

Linear transformations, particularly those used in bootstrapping, play a vital role in enabling FHE operations. These transformations allow for privacy-preserving computations in applications such as secure data analysis, cloud computing, and machine learning models, including linear and logistic regression, convolutional neural networks, and large language models. However, the bootstrapping process is computationally intensive and requires significant memory resources, making it crucial to optimize and accelerate these operations for real-time commercial applications.

One key component of this optimization is the use of rotation key-switching keys (KSKs), typically implemented through the Baby-Step Giant-Step (BSGS) algorithm. In the C2S and S2C bootstrapping steps, the linear transformations of the DFT and IDFT matrices are decomposed into submatrices. These decompositions determine the number of rotations required, which are supported by KSKs. The Cooley-Tukey algorithm, for instance, is used to factorize the DFT and IDFT matrices into submatrices.

The objective of the present disclosure is to provide a solution that minimizes the memory footprint of KSKs during the evaluation mode at runtime, thereby avoiding memory bandwidth bottlenecks and overcoming the computational and memory challenges associated with bootstrapping, enabling the use of FHE in commercial applications.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, the method may include identifying, in an FHE program, key-switching operations occurring after a ModRaise operation. The method may also include determining a first aggregated polynomial sum and a second aggregated polynomial sum; and configuring instructions for performing a MultSum operation based on the determined first aggregated polynomial sum and the second aggregated polynomial sum, the instructions are programmed to be executed during runtime, where the MultSum operation outputs two polynomials, each of which is an inner product between a single cyphertext polynomial and the first aggregated polynomial sum and a single cyphertext polynomial and the second aggregated polynomial sum, thereby reducing memory usage and computational overhead and enhancing key-switching efficiency. Other embodiments of this aspect include corresponding computer systems, apparatus, and computer programs recorded on one or more computer storage devices, each configured to perform the actions of the methods.

Implementations may include one or more of the following features. The method where the first aggregated polynomial sum is a sum of a first part of key-switching key (KSK) and the second aggregated polynomial sum is a sum of a second part of KSK, where each of the first part of the KSK and the second part of the KSK includes a number of d polynomials, where the number d represents a digit decomposition count. The method where the ModRaise operation expands a ciphertext modulus from a small modulus (q) to large modulus (Q) to prepare a ciphertext for subsequent transformations. The method where configuring the instructions further may include: pre-multiplying the second part KSK by its corresponding diagonal plaintext. The method may include: optimizing the digit decomposition count d; and lowering a temporary modulus to decrease the number of single-residue polynomial multiplications and reduce an auxiliary data size. The method where configuring the instructions further may include: reusing a single-digit decomposition result across multiple key-switching operations originating from the same ciphertext. The method where configuring the instructions further may include: dynamically generating the second aggregated polynomial sum from a seed value. The method configuring the instructions further may include: applying the key-switching operation to Coefficients-to-Slots (C2S) transformations in a bootstrapping process, where the transformations include transitions between sparse secret keys and dense secret keys while maintaining ciphertext integrity across iterative processing. The method configuring the instructions further may include: performing subsequent key-switching operations during a bootstrapping process of the FHE program, where each of the key-switching operations is optimized by the determined first aggregated polynomial sum and the second aggregated polynomial sum. Implementations of the described techniques may include hardware, a method or process, or a computer tangible medium.

In one general aspect, non-transitory computer-readable medium may include one or more instructions that, when executed by one or more processors of a device, cause the device to: identify, in an FHE program, key-switching operations occurring after a ModRaise operation; determine a first aggregated polynomial sum and a second aggregated polynomial sum; and configure instructions for performing a MultSum operation based on the determined first aggregated polynomial sum and the second aggregated polynomial sum, the instructions are programmed to be executed during runtime, where the MultSum operation outputs two polynomials, each of which is an inner product between a single cyphertext polynomial and the first aggregated polynomial sum and a single cyphertext polynomial and the second aggregated polynomial sum, thereby reducing memory usage and computational overhead and enhancing key-switching efficiency. Other embodiments of this aspect include corresponding computer systems, apparatus, and computer programs recorded on one or more computer storage devices, each configured to perform the actions of the methods.

In one general aspect, system may include one or more processors configured to: identify, in an FHE program, key-switching operations occurring after a ModRaise operation; determine a first aggregated polynomial sum and a second aggregated polynomial sum; and configure instructions for performing a MultSum operation based on the determined first aggregated polynomial sum and the second aggregated polynomial sum, the instructions are programmed to be executed during runtime, where the MultSum operation outputs two polynomials, each of which is an inner product between a single cyphertext polynomial and the first aggregated polynomial sum and a single cyphertext polynomial and the second aggregated polynomial sum, thereby reducing memory usage and computational overhead and enhancing key-switching efficiency. Other embodiments of this aspect include corresponding computer systems, apparatus, and computer programs recorded on one or more computer storage devices, each configured to perform the actions of the methods.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings. In the drawings

DETAILED DESCRIPTION

Figure 1:
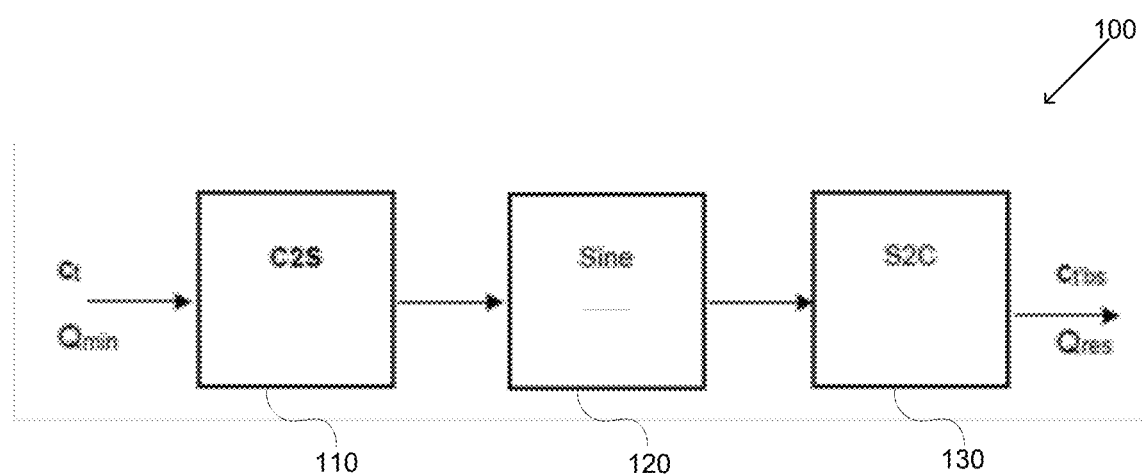
FIG. 1 illustrates the steps of a bootstrapping process in an FHE scheme.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be plural and vice versa with no loss of generality. In the drawings, like numerals refer to like parts through several views.

The objective of the present disclosure encompasses innovations designed to optimize the performance of Fully Homomorphic Encryption (FHE) programs, specifically addressing inefficiencies in key-switching operations that follow the ModRaise process. It also introduces pre-computation techniques for key-switching keys (KSKs) and streamlining the multiplicative summation (MultSum) operation. The MultSum operation outputs two polynomials, each of them an inner product between 'd' input cyphertext polynomials and 'd' polynomials of the KSK. The disclosed embodiments achieve substantial reductions in both computational cost and auxiliary data size. Additionally, in scenarios where key-switching is integrated into homomorphic linear transformations, the disclosed embodiments enable further computational savings through targeted pre-computation based on specific parameter choices, offering enhanced efficiency for complex FHE workflows.

FHE is a groundbreaking technology that enables the secure computation of encrypted data without decryption. However, the core operation of key-switching, integral to FHE schemes like CKKS, BGV, and BFV, poses significant challenges due to its high computational and memory requirements. These difficulties are further intensified when combined with the modulus-increasing operation (ModRaise), a crucial step in bootstrapping workflows.

Some challenges addressed by the present disclosure are related to the high computational demands of the key-switching process. Key-switching is critical for transforming ciphertexts encrypted under one secret key(s) into ciphertexts decryptable under another (s'). Thus, it should be noted that the key-switching process involves several computationally intensive stages.

One technical problem associated with the high computational demands is digit decomposition. The ciphertext component $ct_1$ is decomposed into d polynomials in modulus QP (i.e., a product of modulus Q and temporarily modulus P). This step requires substantial resources, particularly as the modulus Q and residue count d increase. Each polynomial in the decomposition is used for subsequent computations, amplifying the computational load.

Another technical problem associated with the high computational demands relates to multiplicative summation (MultSum). The d-component decomposition is multiplied by corresponding KSK components $KSK_{s \to s} = (KSK_{0,i}, KSK_{1,i})$ producing two new ciphertext components. This process involves 2d polynomial multiplications and additions, scaling poorly as d increases.

Yet, another technical problem associated with the high computational demands relates to modulus decrease (ModDown). After MultSum, the polynomials are reduced back to modulus Q. While often deferred, it introduces further computational overhead when included in the key-switching workflow.

Some challenges addressed by the present disclosure are related to the size of auxiliary data in the key-switching process. The KSK, consisting of 2d polynomials in modulus QP, presents significant challenges due to its size.

One technical problem associated with the size of auxiliary data is memory overhead. The size of the auxiliary data increases significantly with Q and d, placing a burden on memory-constrained hardware, such as accelerators. Another technical problem associated with the size of auxiliary data is communication costs, i.e., memory bandwidth. In FHE implementations, transferring large KSKs between systems and within a single system incurs additional bandwidth requirements, slowing overall performance.

Some challenges addressed by the present disclosure are related to the performance bottlenecks in the key-switching process. Each key-switching operation involves repeated polynomial manipulations, including multiplications, additions, and conversions between representations (i.e. coefficient-mode, evaluation-mode) via NTT. The cumulative computational burden becomes a significant bottleneck in workflows requiring frequent key-switching, such as bootstrapping or iterative computations. This negatively impacts FHE performance by increasing energy consumption and limiting throughput.

Other challenges addressed by the present disclosure are related to modulus increase when combining ModRaise with key-switching. When key-switching follows ModRaise, i.e., an operation that increases the modulus of ciphertexts from q, a small modulus to Q a large modulus, the complexity multiplies. It should be noted that while ModRaise is essential in bootstrapping, it introduces additional hurdles.

Another technical problem associated with the modulus increase is redundant computations. Identical polynomials in digit decomposition: After a ModRaise operation, the digit decompose step in key-switching produces d identical polynomials for $ct_1$, as shown in this equation: $D = \text{DigitDecompose}(ct_1) = (D_0, D_1, \ldots, D_{d-1}) = (D_0, D_0, \ldots, D_0)$. Meaning, that treating each polynomial as unique leads to unnecessary computations. Additionally, direct derivation from ModRaise output: the output of digit decompose can be derived directly from the ModRaise operation. However, conventional methods fail to leverage this insight, leading to duplicated efforts as derived from the following equation: $D_0 = \text{ModRaise}(ct_1^*, q \to QP)$.

Yet another technical problem associated with the modulus increases the memory and bandwidth strain. ModRaise expands polynomials from q to Q, significantly increasing the size of intermediate data. When combined with the large KSK, this amplifies memory and bandwidth demands, further straining hardware resources and reducing efficiency.

Other challenges addressed by the present disclosure are related to scalability. The challenges of key-switching and its integration with a ModRaise operation are rooted in their inability to scale efficiently with increasing ciphertext precision or modulus size. As FHE schemes evolve to support more complex computations, the modulus Q and residue count grow, significantly intensifying the computational and memory demands. This lack of scalability presents a significant barrier to the widespread adoption of FHE in practical, real-time applications.

In some embodiments, the present disclosure enhances the performance of FHE programs by addressing inefficiencies in key-switching, particularly following a ModRaise operation. The disclosed method leverages pre-computation on key-switching key (KSK) and a streamlined MultSum process, resulting in significant reductions in computational costs and auxiliary data size. Furthermore, when key-switching is part of a homomorphic linear transformation, additional computation reductions can be achieved through further pre-computation for specific parameter choices.

One technical solution is the simplification of the MultSum process and KSK pre-computation. The disclosed solution demonstrates that conventional MultSum operation can be significantly simplified. In a typical implementation:

$$(\tilde{ct}_0, \tilde{ct}_1) = \text{MultSum}(D, KSK_{s \to s'}) = \left(\sum_{i=0}^{d-1} D_i \cdot KSK_{0,i}, \sum_{i=0}^{d-1} D_i \cdot KSK_{1,i}\right),$$

where $D_0, D_1, \ldots, D_{d-1}$ are the polynomials obtained from the digit decompose operation.

In some embodiments, by consolidating $$\sum_{i=0}^{d-1} KSK_{0,i} \text{ and } \sum_{i=0}^{d-1} KSK_{1,i}$$

into precomputed sums ($Sum_0, Sum_1$), where $Sum_0$ is the sum of d KSK polynomials $KSK_{0,i}$ and $Sum_1$ is the sum of d KSK polynomials $KSK_{1,i}$, $KSK_{0,i}$ is a first part of the key and $KSK_{1,i}$ is a second part of the key, each includes d polynomials. The MultSum operation can be redefined as: $(\tilde{ct}_0, \tilde{ct}_1)$=MultSum($D_0$,(Sum$_0$,Sum$_1$)), where:

$$(\text{Sum}_0, \text{Sum}_1) = \left( \sum_{i=0}^{d-1} KSK_{0,i}, \sum_{i=0}^{d-1} KSK_{1,i} \right).$$

This redefinition replaces the d-component decomposition by a single pre-computed sum for each KSK component, reducing the number of polynomial multiplications from 2d to just 2. The pre-computation step condenses 2d polynomials into two equations:

$$\text{Sum}_0 = \sum_{i=0}^{d-1} KSK_{0,i} \text{ and } \text{Sum}_1 = \sum_{i=0}^{d-1} KSK_{1,i}.$$

In some embodiments, this step can be performed during key generation or transmitted pre-computed, depending on the system configuration resulting in a smaller auxiliary data size and reduced memory footprint during the MultSum phase.

It should be appreciated that the auxiliary data size is drastically reduced by pre-computing $$\text{Sum}_0 = \sum_{i=0}^{d-1} KSK_{0,i} \text{ and } \text{Sum}_1 = \sum_{i=0}^{d-1} KSK_{1,i}.$$

Thereby, eliminating the need to store 2d KSK polynomials. Such a reduction minimizes memory usage and decreases communication overhead in FHE systems. It should also be noted that with only two polynomial multiplications required in the optimized MultSum process, computational costs are significantly lower compared to conventional methods, which require 2d multiplications. In some embodiments, adjustments to modulus P can further reduce the cost of single-residue polynomial multiplications proportional to log QP.

Additionally, or alternatively, for multiple key-switching operations originating from the same ciphertext and sharing the same digit decompose results, pre-computed sums (Sum$_0$,Sum$_1$) can be used for each participating KSK. This hoisting capability further reduces redundant computations and enhances efficiency.

It should be noted that the disclosed method further enhances the efficiency of key-switching by enabling dynamic generation of $$\text{Sum}_1 = \sum_{i=0}^{d-1} KSK_{1,i}$$

on-the-fly from a seed value during key generation. This approach eliminates the need to store or transmit all d polynomials of the second half of the KSK, significantly reducing memory and communication overhead. By leveraging seed-based generation, the method ensures scalability and adaptability, particularly in resource-constrained systems, while maintaining the computational efficiency gained through the precomputation of Sum$_0$, Sum$_1$. This innovation aligns with the goal of minimizing auxiliary data size and optimizing the key-switching process following ModRaise.

One technical effect of utilizing the disclosed subject matter is observed in bootstrapping scenarios. In some embodiments, following the ModRaise operation, the first coefficients-to-slots (C2S) submatrix baby steps benefit from the simplified key-switching process. Additionally, transitions between sparse and dense secret keys, often required in bootstrapping workflows, gain efficiency from the optimized MultSum process. Furthermore, in workflows requiring parallel computation of C2S matrices at different precisions, consistent parameters can be selected for the decompositions, reducing the computation cost for both matrices and even enabling a single computation.

Another technical effect of utilizing the disclosed subject matter can be seen in a dynamic KSK generation. The pre-computed Sum$_1$ can be generated dynamically from a seed value during key generation, significantly reducing storage requirements while maintaining computational efficiency.

Yet another technical effect is demonstrated in client-side optimization. Pre-computation of Sum$_0$, Sum$_1$ on the client side minimizes the size of data transmitted to servers, thereby reducing communication latency in distributed systems.

Yet another optimization of computational costs is demonstrated in linear transformations by adjusting transformation ratios and pre-multiplication for diagonals. In some embodiments, adjusting transformation ratios may be achieved by reducing the computational cost of baby steps by a factor of d. This allows the ratio $n_1/n_2$ (i.e., parameters of the linear transformation) to be increased, thereby lowering the cost of giant steps. In some embodiments, pre-multiplication for diagonals can be utilized in extreme cases $$\left( \frac{n_1}{n_2} = n \right).$$

Pre-multiplying rotation keys with their corresponding diagonal plaintexts reduce the cost of multiplication by diagonals by half.

Figure 2:
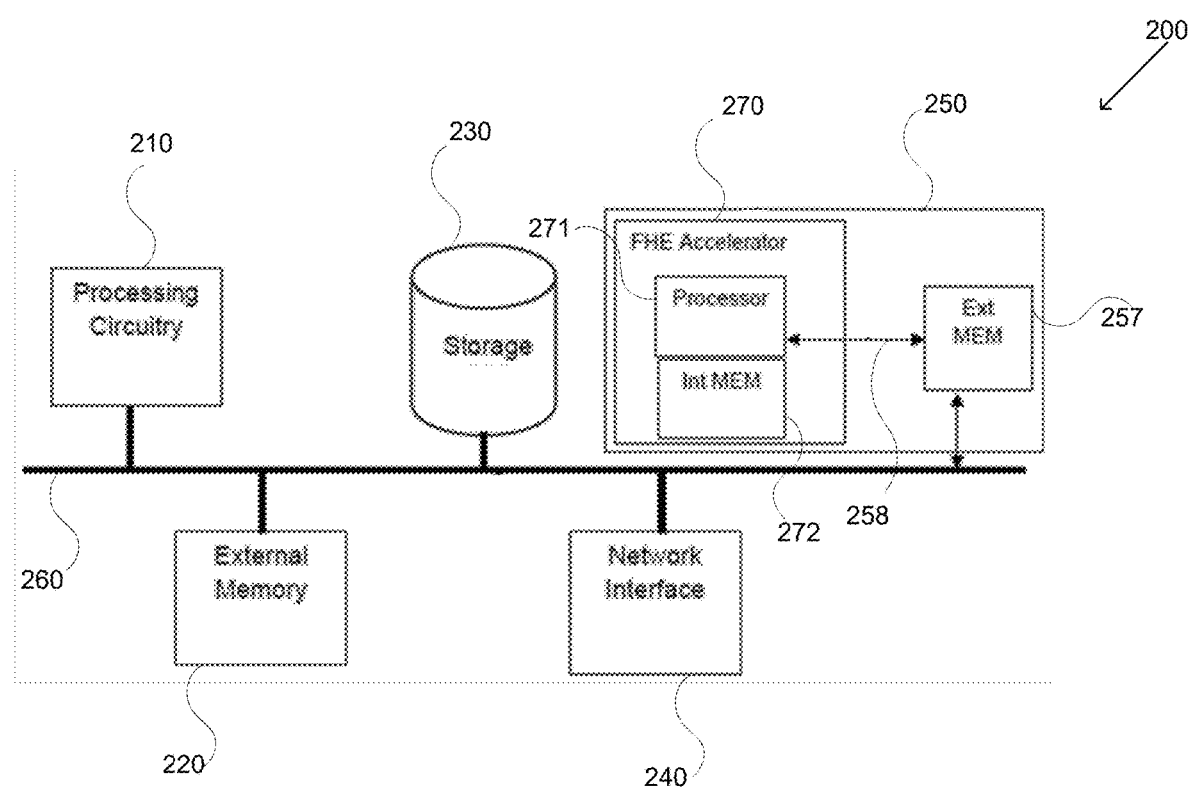
FIG. 2 is an example diagram of a server utilized to explain the various disclosed embodiments, in accordance with some of the disclosed embodiments.
Figure 3:
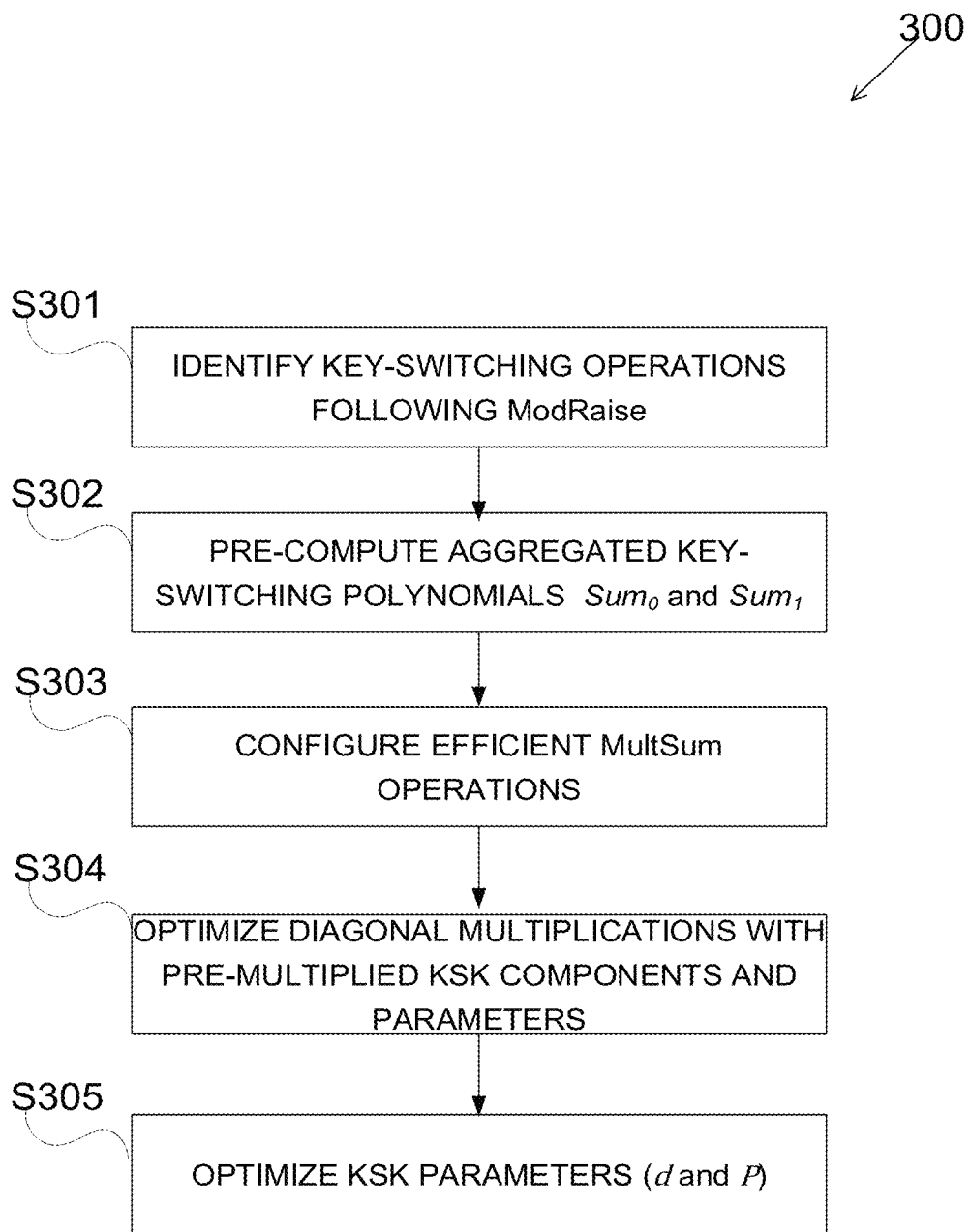
FIG. 3 shows a flowchart diagram of a method for enhancing key-switching efficiency following ModRaise in FHE in accordance with some of the disclosed embodiments.

FIG. 2 is an example diagram of a server 200 utilized to implement the disclosed embodiments. In some exemplary embodiments, server 200 may be a computerized system adapted to perform methods such as depicted in FIG. 3. Server 200 includes a processing circuitry 210 coupled to a memory 220, a storage 230, a network interface 240, and an FHE card 250. In an embodiment, the components of server 200 may be communicatively connected via a bus 260 such as, for example, a PCIe bus.

Processing circuitry 210 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

Memory 220 may be volatile (e.g., random access memory, etc.), non-volatile (e.g., read-only memory, flash memory, etc.), or a combination thereof. Storage 230 may include a non-volatile memory device, magnetic disk drive, optical disk drive, tape drive, and the like. Examples of Memory 220 may include EEPROM, ROM, PROM, RAM, DRAM, SRAM, flash, firmware, programmable logic, and so on. Storage 230 may comprise an internal storage device, an attached storage device and/or a network-accessible storage device, and the like. Network Interface 240 allows Server 200 to communicate with external systems. Network Interface 240 can utilize various communication protocols.

Memory 220 and/or storage 230 may store software required to execute an FHE program or application, that is, a software program that requires the execution of an FHE scheme to perform one or more homomorphic operations, such as bootstrapping and linear transformation.

The FHE program repetitive execution, such as linear transformation and bootstrapping process that, according to the disclosed embodiment, is performed by FHE accelerator 270. It should be noted that software shall be construed broadly to mean any type of instructions, whether referred to as software, firmware, middleware, microcode, hardware description language, or otherwise. Instructions may include code (e.g., in source code format, binary code format, executable code format, or any other suitable format of code).

FHE card 250 is configured to rapidly perform complex homomorphic operations. In some exemplary embodiments, FHE card 250 performs addition, rotation, and multiplication of unencrypted matrixes with an encrypted vector, producing an encrypted output used during Linear Transformation. FHE card 250 can be installed on server 200 or operate as a standalone device. In an embodiment, FHE card 250 includes an FHE accelerator 270.

FHE accelerator 270 includes a processor 271 and an internal memory 272, or several processors with internal memory designed for accelerating FHE scheme computational tasks. Processor 271 may include multiple cores that can manage multiple computation threads simultaneously. Internal memory 272 is a dedicated memory used by processor 271 to store the data for executing the FHE program and routines, such as bootstrapping and linear transformation. Such data may include auxiliary data, encryption keys, indeterminate data, and the like. Internal memory 272 may be, but is not limited to, a cache memory, designed for high bandwidth. Internal memory 272 is typically designed to read and write data at high speeds, thereby enabling processor 271 to quickly access the data stored therein. In some exemplary embodiments, internal memory 272 may be realized as on-die memory.

In one embodiment, FHE accelerator 270 can be realized as an ASIC. In other embodiments, FHE accelerator 270 can be realized as an FPGA, an ASSP, a SoC, and the like, or any other hardware logic components that can perform computation or other manipulations of information.

FHE card 250 includes an external memory 257 and a memory bus 258. Memory bus 258 is an interface through which processor 271 communicates with external memory 257. In some exemplary embodiments, external memory 257 may be an SDRAM, high bandwidth SDRAM (e.g., GDDR5, GDDR6), and high bandwidth memory (HBM). FHE card 250 may also include an interface 259 to interface with bus 260, such as a PCIe.

In some exemplary embodiments, the size of internal memory 272 may be significantly smaller than the size of external memory 257. Internal memory 272 may be realized as "on-die" memory, and the data stored therein allows for the efficient execution of an FHE scheme, specifically a bootstrapping process of such a program. For example, the difference between the memory size of the external memory and the internal memory may be the order of magnitude. In current technologies, the size of internal memory 272 is limited to 1 GB. Increasing the size of internal memory 272 would reduce the number of computing resources.

The disclosed embodiments describe a method relevant for the efficient execution of a linear transformation algorithm, which consequently impacts the execution of bootstrapping and other FHE programs' execution. Additionally, or alternatively, the present disclosure includes computations, such as homomorphic I-DFT and DFT algorithms during the C2S and S2C steps of bootstrapping and evaluation of key switching operations. It should be understood that the embodiments described herein are not limited to the specific architecture illustrated in FIG. 2, and other architectures may be equally used without departing from the scope of the disclosed embodiments.

It will be appreciated that in FHE, a vector of complex numbers, plaintext polynomial, and ciphertext of any length can have a matrix representation. Polynomial diagonals matrix may be viewed as a three-dimensional (3D) matrix for the mathematical convenience of representing a plurality of diagonals (2D matrices) in the same space. Yet, it should be noted that each diagonal represents a different polynomial, a section of a polynomial, or any combination thereof. When performing matrix operations in FHE, such as matrix multiplication or matrix-vector multiplication, diagonals of matrices may be relevant. This can include various computations and operations, such as multiplication, addition, and rotation performed on encrypted data, ciphertext, plaintext, and the like, or any combination thereof.

It should be noted that in FHE, computations may employ RNS (Residue Number Systems) that efficiently represent and manipulate encrypted data by performing computations modulo a set of pairwise relatively prime moduli. RNS enhances operations like addition and multiplication. In each diagonal polynomial, coefficients are associated with the columns and the residues with the rows of the matrix. Thus, the number of columns may be equal to the number of coefficients, while the number of rows may be equal to the number of residues. For example, a matrix incorporating C2S auxiliary-data may have 56 residues (rows), i.e., (L+K) polynomial residues, whereas a matrix incorporating an S2C auxiliary-data may have 28 residues (rows), while in both cases they may have 65,536 coefficients (columns).

It will be appreciated that while the embodiments of the linear transformation described in the present disclosure refer to bootstrapping and FHE operations, the disclosed linear transformation enhancements may also be utilized by other programs that implement linear transformations capable of utilizing rotation offsets.

FIG. 3 shows a flowchart diagram of method 300 for enhancing key-switching efficiency following ModRaise operations in FHE applications, in accordance with some of the disclosed embodiments.

Method 300 utilizes pre-computation techniques for key-switching to aggregate 2d KSK polynomials into two pre-computed sums ($Sum_0$ and $Sum_1$). In some embodiments, this aggregation reduces memory requirements and computational complexity. During runtime, an optimized multiplicative summation (MultSum) operation leverages these pre-computed sums, reducing the number of required polynomial multiplications from 2d to two.

Additionally, method 300 may incorporate pre-multiplying half of the KSK by diagonal plaintexts. This optimization reduces the computational cost of diagonal multiplications, particularly in cases involving extreme parameter configurations. In some embodiments, method 300 also supports the dynamic generation of KSK components from seed values during key generation, thereby reducing auxiliary data size while maintaining computational efficiency.

In some embodiments, memory usage, and computational overhead may also be optimized by adjusting parameters such as the digit decomposition count (d) and the temporary modulus (P).

In some embodiments, the following steps of method 300 may be configured during the compilation process of an FHE application by a server, such as server 200 of FIG. 2. It should be appreciated that method 300 is designed to optimize the execution of processes performed in accelerators, such as FHE accelerator 270 of FIG. 2, during runtime. By implementing method 300, improvements in memory utilization and runtime efficiency are achieved, enabling more efficient key-switching operations in workflows such as bootstrapping, iterative computations, and linear transformations.

In S301, key-switching operations following ModRaise operations may be identified. It should be noted that FHE programs usually include a sequence of operations involving ModRaise and key-switching, particularly in bootstrapping workflows. ModRaise expands the modulus of ciphertexts from q to Q, which is a critical step for preparing ciphertexts for subsequent computations. In many scenarios, a key-switching operation immediately follows a ModRaise operation to adjust the ciphertext, so that the ciphertext remains compatible with a new secret key. The ModRaise operations are explicit commands that may be parsed out in the program code.

In some embodiments, identified key-switching operations may correspond to frequent transitions that occur immediately after ModRaise operations in bootstrapping workflows. These workflows typically include numerous key-switching operations as part of noise level reduction or transition between sparse and dense secret keys. By focusing optimization efforts on these identified operations, computational resources may be directed to maximize efficiency, ensuring pre-computation and runtime execution improvements are applied where they deliver the most significant benefits.

Furthermore, by pinpointing these operations, method 300 ensures that pre-computation and efficient runtime execution are strategically targeted to maximize their impact.

For example, key-switching operations following ModRaise operations in bootstrapping workflows typically involve iterative key-switching operations. A ModRaise operation expands the ciphertext modulus from q to Q to prepare for transformations. Key-switching ensures compatibility with a new secret key while maintaining precision and structural integrity. This sequence is crucial in coefficients-to-slots (C2S) transformations, a core bootstrapping component, enabling transitions between types of encoding while preserving ciphertext integrity during iterative processing.

In S302, aggregated key-switching polynomials $Sum_0$ and $Sum_1$ may be determined. A key-switching operation conventionally relies on a set of KSKs, including 2d polynomials per KSK, to facilitate ciphertext transformations. In some embodiments, method 300 simplifies this process by pre-computing, for each relevant KSK, two aggregated polynomials:

$$Sum_0 = \sum_{i=0}^{d-1} KSK_{0,i} \text{ and } Sum_1 = \sum_{i=0}^{d-1} KSK_{1,i}.$$

In some embodiments, pre-computation reduces memory usage by requiring only the storage of the two aggregated polynomials, $Sum_0$ and $Sum_0$, instead of 2d individual KSK polynomials. Additionally, or alternatively, pre-computation shifts part of the computational workload to the key generation phase, thereby simplifying runtime execution and reducing overhead during program operation.

For example, setting parameters to: $N=2^{15}$, $n=n_1 n_2=256$, with modulus log $QP_{max}=880$, $d=7$ and a 64-bit word size. Starting Q is represented by L=14 residues, and P is represented by 2 residues in the conventional implementation. First, the computational efficiency is improved by applying the disclosed method, including lowering P so that K=1. Further improvement is achieved by pre-multiplying rotation keys by the diagonals. The computational cost is then analyzed as a function of the ratio $$\frac{n_1}{n_2}.$$

The following TABLE 1, snows the results of optimized computation cost using optimized parameters.

TABLE 1

|  | Traditional | Basic method | With Pre-Multiplication of KSKs by diagonals |
|---|---|---|---|
| # of multiplications | $8.4 \cdot 10^8$ | $4.5 \cdot 10^8$ | $4.0 \cdot 10^8$ |
| # of KSKs ($n_1$) | 32 | 128 | 256 |
| Total KSK size [MB] | 1879 | 1007 | 2013 |

This, in total, demonstrates a reduction of approximately $3.9 \cdot 10^8$ to $4.4 \cdot 10^8$ multiplications, corresponding to an approximate 12% decrease in the computational cost of the bootstrapping process. This highlights the method's potential for significant improvements in both computation and memory management in FHE workflows.

In some embodiments, $Sum_1$ (i.e., the second aggregated polynomial of the KSK), may be generated dynamically from a seed value during the key generation phase. Instead of pre-computing and storing all d individual polynomials of the second half of the KSK, a seed value may be utilized to compute $$Sum_1 = \sum_{i=0}^{d-1} KSK_{1,i}$$

on-the-fly.

In some embodiments, the dynamic generation of $Sum_1$ from a seed value during key generation minimizes memory usage by eliminating the need to store all d individual polynomials of the second half of the KSK, retaining only the seed and one polynomial. This approach reduces communication overhead by minimizing the auxiliary data size transmitted between components, such as client and server, making it particularly effective in distributed systems. Additionally, or alternatively, dynamic generation of $Sum_1$ preserves computational efficiency, ensuring the benefits of pre-computation are maintained without introducing significant delays.

In S303, efficient MultSum operations may be configured to be executed at runtime. It should be noted that conventional MultSum operations involve multiplying each decomposed component ($D_0, D_1, \ldots, D_{d-1}$) with corresponding KSK components. This process requires 2d polynomial multiplications for each of the d-component decompositions followed by summing the results to generate the transformed ciphertext.

In some embodiments, the KSK polynomials are aggregated into pre-computed ($Sum_0$ and $Sum_1$), and the MultSum operation can be redefined: ($\tilde{ct}_0, \tilde{ct}_1$)=MultSum($D_0$, ($Sum_0, Sum_1$)). This redefinition reduces the number of polynomial multiplications from 2d to just two, significantly improving runtime performance.

In some embodiments, performing efficient MultSum operation, according to the disclosed embodiments, includes a single polynomial multiplication with $Sum_0$ and a single polynomial multiplication with $Sum_1$ to produce the transformation result.

In some embodiments, a concept of hoisting, which reuses a single-digit decompose result across multiple key-switching operations originating from the same ciphertext, may be applied to optimize runtime performance. By sharing digit decomposes results, redundant computations can be eliminated, streamlining the MultSum operation in scenarios involving multiple sequential key-switching operations. This approach extends the applicability of method 300 beyond single key-switching operations, ensuring efficiency in workflows where repeated transformations of the same ciphertext are required.

In S304, diagonal multiplications may be optimized by leveraging pre-multiplied KSK components and specific parameter configurations. In some embodiments, particularly when $n_1/n_2$ is increased $$\left(\text{e.g., } \frac{n_1}{n_2} = n\right),$$

the method reduces computational costs by pre-multiplying half of the KSK by its corresponding diagonal plaintext. This optimization effectively halves the cost of diagonal multiplications, especially in parameter configurations requiring high-efficiency transformations.

The method introduces an improvement by decreasing the baby steps cost by a factor of d, allowing the parameter $n_1/n_2$ to be increased. This increase directly impacts the computation flow of diagonal multiplications by reducing the computational cost of giant steps. This relationship highlights the importance of parameter tuning and the benefits of aligning computations to high-cost processes.

These optimizations are particularly advantageous in scenarios requiring linear transformations, such as bootstrapping or iterative computations. By reducing baby steps and diagonal multiplication costs, the method provides significant runtime efficiency while maintaining precision in large-scale FHE workflows.

Additionally, the method incorporates client-side optimization to further enhance performance. The sum polynomials $Sum_0$ and $Sum_1$ can be pre-computed on the client side before transmission to reduce communication overhead in distributed systems. By minimizing the size of transmitted data, this approach ensures resource efficiency and reduces latency, particularly in environments where client-server interactions are frequent.

For instance, by pre-multiplying rotation keys, the computational cost is reduced from $4.5 \cdot 10^8$ multiplications (with pre-computed sums) to $4.0 \cdot 10^8$, achieving an additional 11% reduction in runtime computation. This example demonstrates the effectiveness of the method in achieving scalability and operational efficiency.

In S305, the parameters d (digit decomposition count) and P (temporary modulus) may be optimized to balance computational workload and memory usage. It is important to note that these parameters play a pivotal role in determining the efficiency of key-switching operations, directly impacting runtime performance and resource consumption.

In some embodiments, adjusting d is enabled since the method is independent of the value of d. Increasing d, and thus lowering P decreases the number of single-residue polynomial multiplications, as well the as size of the pre-computed $Sum_0$ and $Sum_1$, both of which scale proportionally with log QP. This adjustment enhances runtime efficiency and improves system adaptability for resource-intensive FHE workflows.

For example, parameter adjustments in an FHE application demonstrate substantial improvements in memory usage and computational costs. Memory consumption can be reduced significantly, such as from 1879 MB to 1007 MB, while computational demands are minimized, ensuring scalability even for complex workflows. These optimizations make the method more adaptable to practical applications, facilitating the effective implementation of FHE in scenarios requiring repeated or resource-intensive key-switching operations.

The disclosed method, as demonstrated through integrated examples, achieves significant advancements in Fully Homomorphic Encryption (FHE) performance. By leveraging pre-computed sums, the size of the key-switching key (KSK) may be reduced by 50% or more, enhancing memory efficiency. Additionally, optimized MultSum operations and diagonal pre-multiplication contribute to runtime computational savings of up to 52% or more. Adjustments to key parameters further ensure scalability, enabling the method to adapt seamlessly to resource-constrained environments and large-scale FHE workflows. Together, these optimizations establish a robust framework that enhances the practicality and efficiency of FHE for real-world applications.

The various embodiments disclosed herein can be implemented as hardware, firmware, software, or any combination thereof. Moreover, the software is preferably implemented as an application program tangibly embodied on a program storage unit or computer-readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), memory, and input/output interfaces. The computer platform may also include an operating system and microinstruction code. The various processes and functions described herein may be either part of the microinstruction code or part of the application program or any combination thereof, which may be executed by a CPU, whether or not such a computer or processor is explicitly shown. In addition, various other peripheral units may be connected to the computer platform, such as an additional data storage unit and a printing unit. Furthermore, a non-transitory computer-readable medium is any computer-readable medium except for a transitory propagating signal.

All examples and conditional language recited herein are intended for pedagogical purposes to aid the reader in understanding the principles of the disclosed embodiment and the concepts contributed by the inventor to further the art and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to the first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for enhancing key-switching efficiency in a fully homomorphic encryption (FHE) system, the method comprising:
   identifying, in an FHE program stored within a hardware memory, key-switching operations occurring after a ModRaise operation;
   determining a first aggregated polynomial sum and a second aggregated polynomial sum, wherein the first aggregated polynomial sum and the second aggregated polynomial sum are pre-computed sums; and
   configuring instructions for performing a MultSum operation based on the determined first aggregated polynomial sum and the second aggregated polynomial sum, the instructions are programmed to be executed during runtime, wherein the MultSum operation outputs two polynomials, each of which is an inner product between a single cyphertext polynomial and the first aggregated polynomial sum and a single cyphertext polynomial and the second aggregated polynomial sum which reduces memory usage and computational overhead and enhances key-switching efficiency.

2. The method of claim 1, wherein the first aggregated polynomial sum is a sum of a first part of key-switching key (KSK) and the second aggregated polynomial sum is a sum of a second part of KSK, wherein each of the first part of the KSK and the second part of the KSK includes a number of d polynomials, wherein the number d represents a digit decomposition count.

3. The method of claim 2, wherein the ModRaise operation expands a ciphertext modulus from a small modulus (q) to large modulus (Q) to prepare a ciphertext for subsequent transformations.

4. The method of claim 2, wherein configuring the instructions further comprises: pre-multiplying the second part KSK by its corresponding diagonal plaintext.

5. The method of claim 2, further comprising: optimizing the digit decomposition count d; and lowering a temporary modulus to decrease the number of single-residue polynomial multiplications and reduce an auxiliary data size.

6. The method of claim 1, wherein configuring the instructions further comprises: reusing a single-digit decomposition result across multiple key-switching operations originating from the same ciphertext.

7. The method of claim 1, wherein configuring the instructions further comprises: dynamically generating the second aggregated polynomial sum from a seed value.

8. The method of claim 1, configuring the instructions further comprises: applying the key-switching operation to coefficients-to-slots (C2S) transformations in a bootstrapping process, wherein the transformations include transitions between sparse secret keys and dense secret keys while maintaining ciphertext integrity across iterative processing.

9. The method of claim 1, configuring the instructions further comprises: performing subsequent key-switching operations during a bootstrapping process of the FHE program, wherein each of the key-switching operations is optimized by the determined first aggregated polynomial sum and the second aggregated polynomial sum.

10. A non-transitory computer-readable medium storing a set of instructions for enhancing key-switching efficiency in a fully homomorphic encryption (FHE) system, the set of instructions comprising:
    one or more instructions that, when executed by one or more processors of a device, cause the device to:
    identify, in an FHE program, key-switching operations occurring after a ModRaise operation;
    determine a first aggregated polynomial sum and a second aggregated polynomial sum, wherein the first aggregated polynomial sum and the second aggregated polynomial sum are pre-computed sums; and
    configure instructions for performing a MultSum operation based on the determined first aggregated polynomial sum and the second aggregated polynomial sum, the instructions are programmed to be executed during runtime, wherein the MultSum operation outputs two polynomials, each of which is an inner product between a single cyphertext polynomial and the first aggregated polynomial sum and a single cyphertext polynomial and the second aggregated polynomial sum which reduces memory usage and computational overhead and enhances key-switching efficiency.

11. A system for enhancing key-switching efficiency in a fully homomorphic encryption (FHE) system comprising:
    one or more processors configured to:
    identify, in an FHE program stored within a hardware memory, key-switching operations occurring after a ModRaise operation;
    determine a first aggregated polynomial sum and a second aggregated polynomial sum, wherein the first aggregated polynomial sum and the second aggregated polynomial sum are pre-computed sums; and
    configure instructions for performing a MultSum operation based on the determined first aggregated polynomial sum and the second aggregated polynomial sum, the instructions are programmed to be executed during runtime, wherein the MultSum operation outputs two polynomials, each of which is an inner product between a single cyphertext polynomial and the first aggregated polynomial sum and a single cyphertext polynomial and the second aggregated polynomial sum which reduces memory usage and computational overhead and enhances key-switching efficiency.

* * * * *